United States Patent
Hu

(10) Patent No.: US 8,080,903 B2
(45) Date of Patent: Dec. 20, 2011

(54) POWER SUPPLY CIRCUIT FOR SATA CONTROL CHIP

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/557,533

(22) Filed: Sep. 11, 2009

(65) Prior Publication Data

US 2010/0321097 A1    Dec. 23, 2010

(30) Foreign Application Priority Data

Jun. 18, 2009   (CN) .......................... 2009 1 0303412

(51) Int. Cl.
*H04B 3/00* (2006.01)
(52) U.S. Cl. ......................................................... 307/89
(58) Field of Classification Search ..................... 307/89
See application file for complete search history.

(56) References Cited

U.S. PATENT DOCUMENTS

2006/0202770 A1* 9/2006 Adachi et al. ........... 331/107 DP
2010/0290200 A1* 11/2010 Yamamoto et al. ........... 361/752
* cited by examiner

*Primary Examiner* — Robert L. Deberadinis
(74) *Attorney, Agent, or Firm* — Altis Law Group, Inc.

(57) ABSTRACT

A power supply circuit includes a first power circuit having a first power output terminal and a first ground output terminal, a second power circuit having a second power output terminal and a second ground output terminal, and a SATA control chip having a first input terminal, a second input terminal, a third input terminal, and a fourth input terminal. The first power circuit comprises a first filter circuit. The second power circuit comprises a second filter circuit. The first power output terminal, first ground output terminal, second power output terminal, and second ground output terminal are electrically coupled to the SATA control chip via the first input terminal, second input terminal, third input terminal, and fourth input terminal respectively. The first and second power circuits provide power to the SATA control chip via the first and second filter circuits respectively.

10 Claims, 2 Drawing Sheets

POWER SUPPLY CIRCUIT FOR SATA CONTROL CHIP

BACKGROUND

1. Technical Field

The present disclosure relates to power supply circuits, and particularly to a power supply circuit for a Serial Advanced Technology Attachment (SATA) control chip.

2. Description of Related Art

Some hard disc may be controlled by a SATA control chip, and a power supply is used for providing power to the SATA control chip. However, the power supply generates large amounts of ripple voltages which slow the SATA control chip in accessing the hard disc, and thus startup of the computer may be slowed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
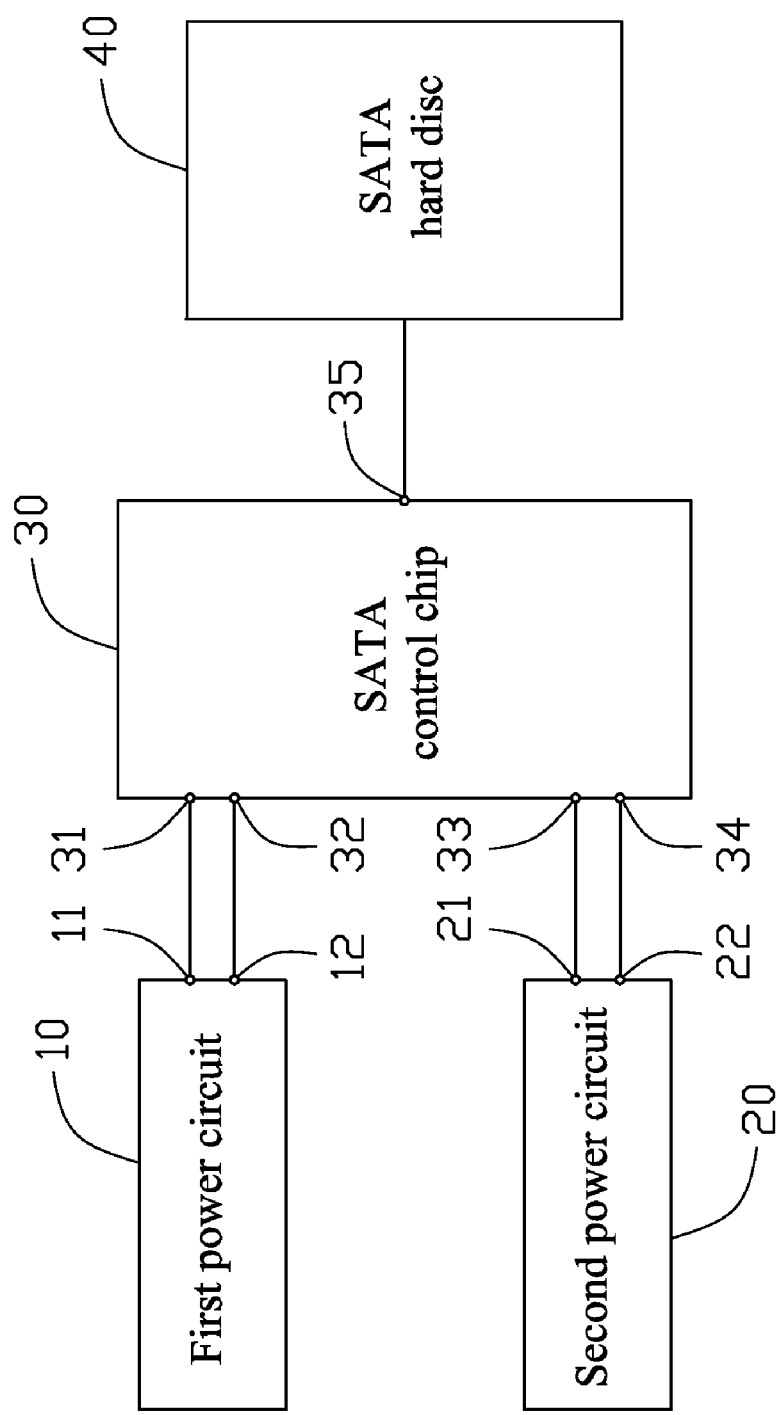
FIG. 1 is a block diagram of a power supply circuit for a SATA control chip, in accordance with an embodiment.

Referring to FIG. 1, a power supply circuit for a SATA control chip 30 includes a first power circuit 10, a second power circuit 20. The first power circuit 10 has a first power output terminal 11, and a first ground output terminal 12. The second power circuit 20 has a second power output terminal 21, and a second ground output terminal 22. The SATA control chip 30 includes a data receiving power input terminal 31, a data receiving ground input terminal 32, a Phase-Locked Loop (PLL) power input terminal 33, a PLL ground input terminal 34, and an output terminal 35. The first power output terminal 11 and first ground output terminal 12 are electrically coupled to the data receiving power input terminal 31 and data receiving ground input terminal 32 respectively. The second power output terminal 21 and second ground output terminal 22 are electrically coupled to the PLL power input terminal 33 and PLL ground input terminal 34 respectively. The output terminal 35 is electrically coupled to a SATA hard disc 40.

Figure 2:
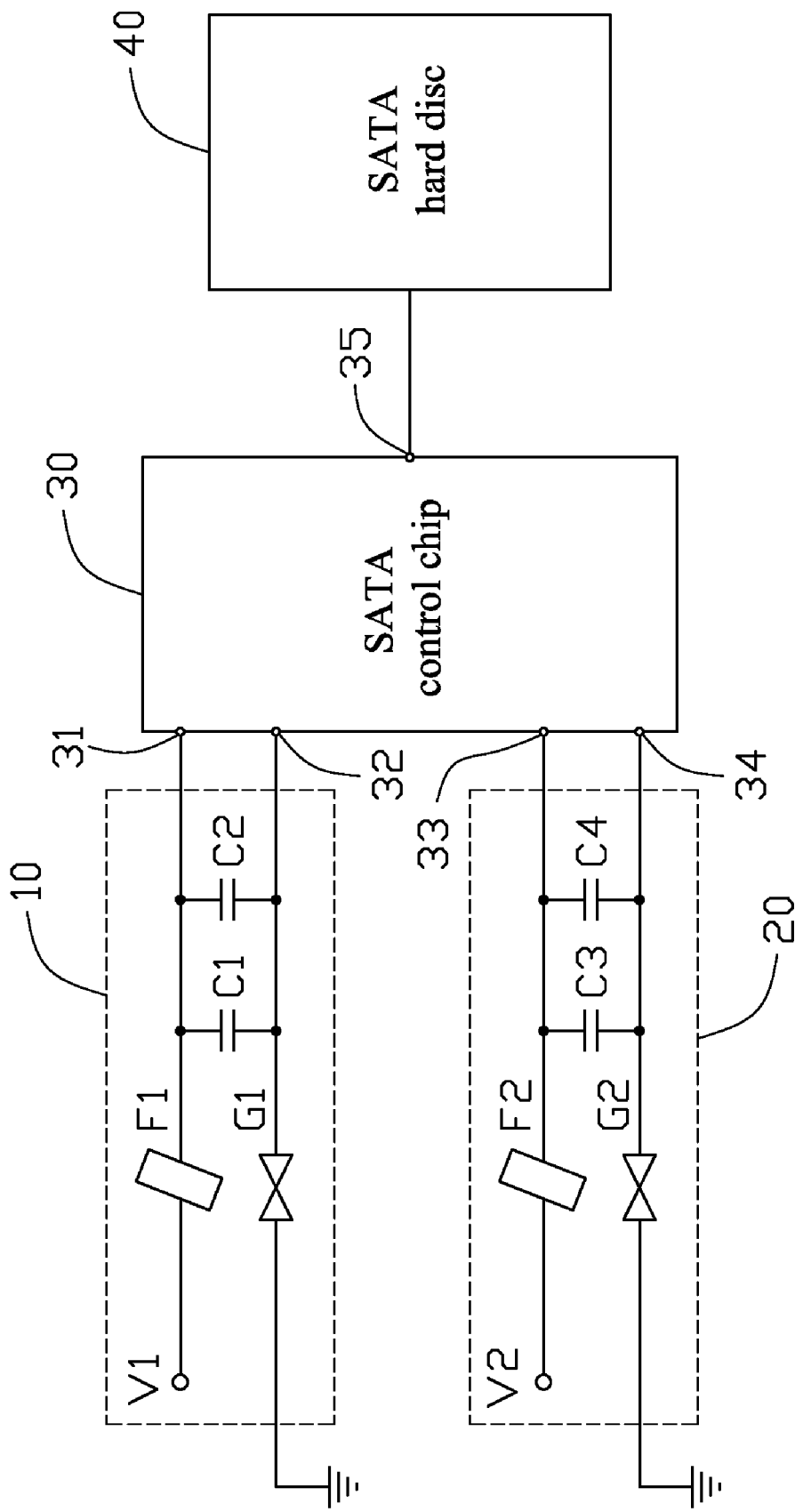
FIG. 2 is a circuit diagram of the power supply circuit for the SATA control chip of FIG. 1.

Referring to FIG. 2, the first power circuit 10 includes a first power input terminal V1, a bead inductor F1, capacitors C1, C2, and a copper foil G1. The capacitors C1, C2 first terminals are electrically coupled to the first power input terminal V1 via the bead inductor F1, and are electrically coupled to the data receiving power input terminal 31 via the first power output terminal 11. The capacitors C1, C2 second terminal are grounded via the copper foil G1, and are electrically coupled to the data receiving ground input terminal 32 via the first ground output terminal 12. In this embodiment, a capacitance value of the capacitor C1 is 0.1 μF. A capacitance value of the capacitor C2 is 10 nF. An impedance value of the bead inductor F1 is 300 ohms.

The second power circuit 20 includes a second power input terminal V2, a bead inductor F2, capacitors C3, C4, and a copper foil G2. The capacitors C3, C4 first terminals are electrically coupled to the second power input terminal V2 via the bead inductor F2, and are electrically coupled to the PLL power input terminal 33 via the second power output terminal 21. The capacitors C3, C4 second terminals are grounded via the copper foil G2, and are electrically coupled to the PLL ground input terminal 34 via the second ground output terminal 22. In this embodiment, a capacitance value of the capacitor C3 is 0.1 μF. A capacitance value of the capacitor C4 is 10 nF. An impedance value of the bead inductor F2 is 600 ohms.

The first and second power input terminals V1, V2 are coupled to a power supply (not shown) of a computer (not shown) for receiving a 1.8V DC voltage and a 3.3 V DC voltage respectively. The capacitors C1, C2 form a first filter circuit, and the capacitors C3, C4 form a second filter circuit. When the computer starts up, the 1.8V and 3.3 V DC voltages flow through the first and second power circuits 10, 20 respectively. The 1.8V and 3.3 V DC voltages are filtered by the bead inductors F1, F2 respectively, and ripple voltages of the power supply (not shown) are filtered from the 1.8V and 3.3 V DC voltages. Therefore, influence of the ripple voltages is eliminated.

Using an oscillograph to test voltage signals at output terminals of the power supply circuit for a SATA control chip, the test result shows that the ripple voltages at the data receiving power input terminal 31 and PLL power input terminal 33 are 41.4 mv and 48.8 mv respectively when the power supply circuit for a SATA control chip of the disclosure, and 51.4 mv and 150 mv respectively when using a common power supply circuit.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit, comprising:
a first power circuit having a first power output terminal and a first ground output terminal, the first power circuit comprising a first filter circuit;
a second power circuit having a second power output terminal and a second ground output terminal, the second power circuit comprising a second filter circuit; and
a SATA control chip having a first input terminal, a second input terminal, a third input terminal, and a fourth input terminal, the first power output terminal, the first ground output terminal, the second power output terminal, and the second ground output terminal being electrically coupled to the SATA control chip via the first input terminal, the second input terminal, the third input terminal, and the fourth input terminal respectively, wherein the first and second power circuits provide power to the SATA control chip via the first and second filter circuits respectively; wherein the first power circuit further comprises a first power input terminal, a first bead inductor and a first copper foil; the first filter circuit comprises a first capacitor and a second capacitor, first terminals of the first and second capacitors are electrically coupled to the first power input terminal via the first bead inductor, and are electrically coupled to the first input terminal via the first power output terminal, second terminals of the first and second capacitors are grounded via the first copper foil, and are electrically coupled to the second input terminal via the first ground output terminal.

2. The power supply circuit of claim 1, wherein the first input terminal, second input terminal, third input terminal, and fourth input terminal are data receiving power input terminal, data receiving ground input terminal, Phase-Locked Loop (PLL) power input terminal, and PLL ground input terminal respectively.

3. The power supply circuit of claim 2, wherein the second power circuit further comprises a second power input terminal, the second filter circuit comprises a third capacitor and a fourth capacitor, first terminals of the third and fourth capacitors are electrically coupled to the second power input terminal, and are electrically coupled to the PLL power input terminal via the second power output terminal, second terminals of the third and fourth capacitors are grounded, and are electrically coupled to the PLL ground input terminal via the second ground output terminal.

4. The power supply circuit of claim 3, wherein the second power circuit further comprises a second bead inductor, and a second copper foil, the first terminals of the third and fourth capacitors are electrically coupled to the second power input terminal via the second bead inductor, the second terminals of the third and fourth capacitors are grounded via the second copper foil.

5. The power supply circuit of claim 4, wherein an impedance value of the second bead inductor is 600 ohm, a capacitance value of the third capacitor is 0.1 µF, and a capacitance value of the fourth capacitor is 10 nF.

6. The power supply circuit of claim 1, wherein an impedance value of the first bead inductor is 300 ohm, a capacitance value of the first capacitor is 0.1 µF, and a capacitance value of the second capacitor is 10 nF.

7. A power supply circuit, comprising:
a first power circuit having a first power output terminal and a first ground output terminal, the first power circuit comprising:
a first power input terminal;
a first filter circuit having a first capacitor and a second capacitor, the first and second capacitors first terminals are electrically coupled to the first power input terminal, the first and second capacitors second terminals are grounded; and
a SATA control chip having a data receiving power input terminal, and a data receiving ground input terminal, wherein the first and second capacitors first terminals are electrically coupled to the data receiving power input terminal via the first power output terminal, the first and second capacitors second terminals are electrically coupled to the data receiving ground input terminal via the first ground output terminal; wherein the first power circuit further comprises a first bead inductor, and a first copper foil, first terminals of the first and second capacitors are electrically coupled to the first power input terminal via the first bead inductor, second terminals of the first and second capacitors are grounded via the first copper foil.

8. The power supply circuit of claim 7, further comprising a second power circuit having a second power output terminal and a second ground output terminal, the second power circuit comprises a second power input terminal, and a second filter circuit having a third capacitor and a fourth capacitor, first terminals of the third and fourth capacitors are electrically coupled to the second power input terminal, second terminals of the third and fourth capacitors are grounded.

9. The power supply circuit of claim 8, wherein the second power circuit further comprises a second bead inductor, and a second copper foil, the first terminals of the third and fourth capacitors are electrically coupled to the second power input terminal via the second bead inductor, the second terminals of the third and fourth capacitors are grounded via the second copper foil.

10. The power supply circuit of claim 9, wherein the SATA control chip further comprises a Phase-Locked Loop (PLL) power input terminal, and a PLL ground input terminal, the first terminals of the third and fourth capacitors are electrically coupled to the PLL power input terminal via the second power output terminal, the second terminals of the third and fourth capacitors are electrically coupled to the PLL ground input terminal via the second ground output terminal.

* * * * *